(12) United States Patent
Venkataraman et al.

(10) Patent No.: US 10,840,530 B2
(45) Date of Patent: Nov. 17, 2020

(54) HIGH EFFICIENCY FUEL CELL SYSTEM WITH INTERMEDIATE $CO_2$ RECOVERY SYSTEM

(71) Applicant: FuelCell Energy, Inc., Danbury, CT (US)

(72) Inventors: Ramakrishnan Venkataraman, Danbury, CT (US); Mohammad Farooque, Marlboro, NJ (US)

(73) Assignee: FUELCELL ENERGY, INC., Danbury, CT (US)

( * ) Notice: Subject to any disclaimer, the term of this patent is extended or adjusted under 35 U.S.C. 154(b) by 208 days.

(21) Appl. No.: 16/095,281

(22) PCT Filed: Apr. 20, 2017

(86) PCT No.: PCT/US2017/028526
§ 371 (c)(1),
(2) Date: Oct. 19, 2018

(87) PCT Pub. No.: WO2017/184818
PCT Pub. Date: Oct. 26, 2017

(65) Prior Publication Data
US 2020/0168936 A1    May 28, 2020

Related U.S. Application Data

(60) Provisional application No. 62/325,874, filed on Apr. 21, 2016.

(51) Int. Cl.
*H01M 8/06* (2016.01)
*H01M 8/0668* (2016.01)
*H01M 8/04701* (2016.01)
*H01M 8/04007* (2016.01)
*H01M 8/04089* (2016.01)

(52) U.S. Cl.
CPC ..... *H01M 8/0668* (2013.01); *H01M 8/04007* (2013.01); *H01M 8/04097* (2013.01); *H01M 8/04716* (2013.01)

(58) Field of Classification Search
CPC .......... H01M 8/0668; H01M 8/04007; H01M 8/04097; H01M 8/04716
See application file for complete search history.

(56) References Cited

U.S. PATENT DOCUMENTS

| | | | | |
|---|---|---|---|---|
| 8,343,671 | B2 * | 1/2013 | Qi | H01M 8/04097 429/412 |
| 9,520,607 | B2 * | 12/2016 | Berlowitz | C01B 3/48 |
| 2006/0115691 | A1 * | 6/2006 | Hilmen | H01M 8/0668 429/411 |

* cited by examiner

*Primary Examiner* — Raymond Alejandro
(74) *Attorney, Agent, or Firm* — Foley & Lardner LLP

(57) ABSTRACT

A high efficiency fuel cell system includes a topping fuel cell assembly including a topping cathode portion and a topping anode portion; a carbon dioxide separation unit that receives at least a portion of an anode exhaust stream output from the topping anode portion and separates the portion of the anode exhaust stream into a carbon dioxide stream and a carbon dioxide depleted stream; and a bottoming fuel cell assembly including a bottoming cathode portion and a bottoming anode portion. The bottoming anode portion receives the carbon dioxide depleted stream output from the carbon dioxide separation unit. The carbon dioxide depleted stream being richer in hydrogen than the portion of the anode exhaust stream output from the topping anode portion.

20 Claims, 1 Drawing Sheet

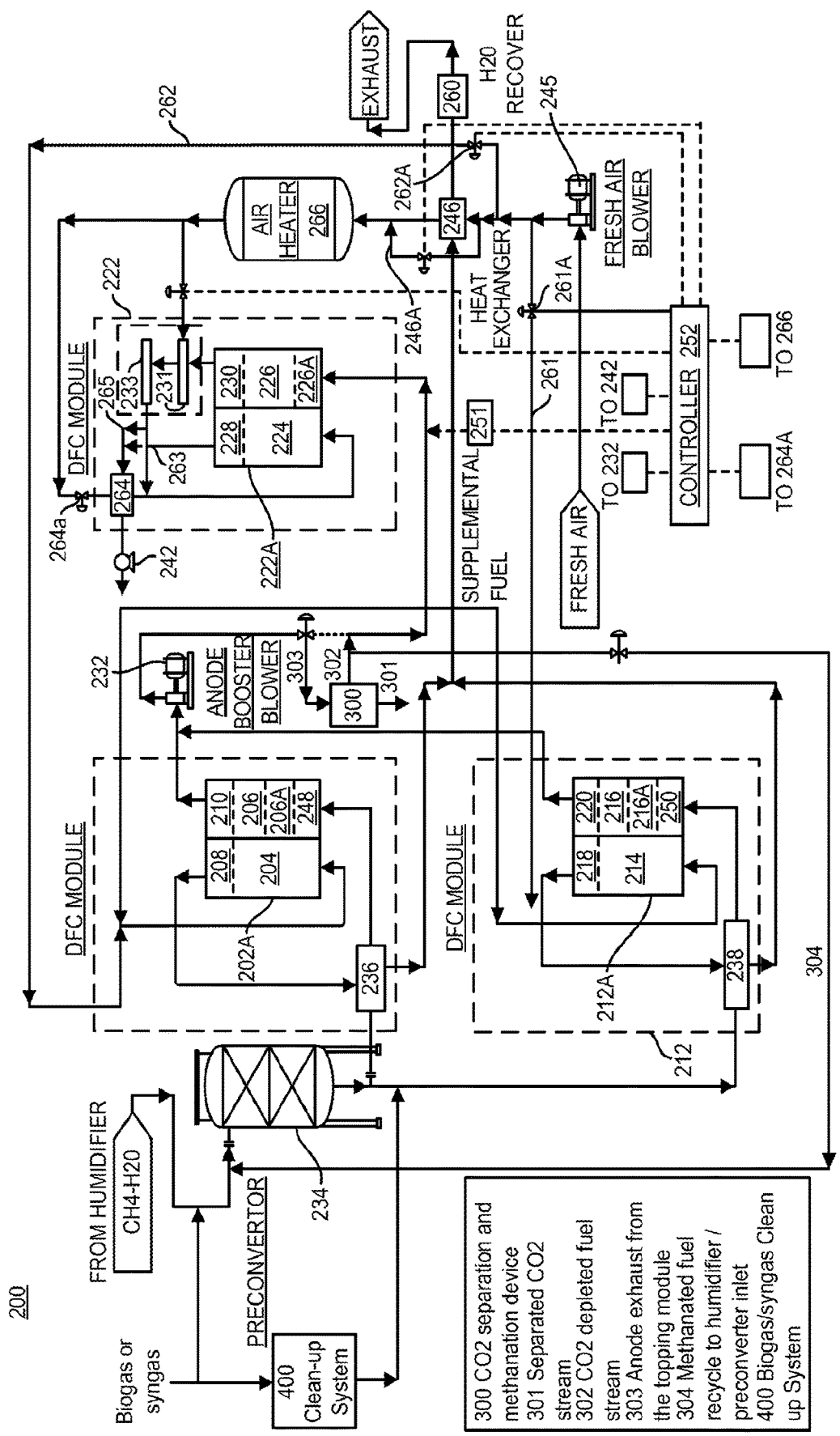

HIGH EFFICIENCY FUEL CELL SYSTEM WITH INTERMEDIATE $CO_2$ RECOVERY SYSTEM

CROSS-REFERENCE TO RELATED APPLICATIONS

This application is a U.S. national phase application under 35 U.S.C. § 371 of International Application No. PCT/US2017/028526, filed on Apr. 20, 2017, which claims the benefit of and priority to U.S. Provisional Patent Application No. 62/325,874, filed on Apr. 21, 2016, the entire disclosures of which are incorporated by reference herein.

BACKGROUND

This present disclosure relates to multi-stack high-efficiency fuel cell system capable of having an intermediate $CO_2$ recovery system to recover $CO_2$ present in exhaust produced by an anode of a topping fuel cell module. The systems of the present disclosure may be used with any types of fuel cells, and particularly with molten carbonate fuel cells and solid oxide fuel cells.

A fuel cell is a device which directly converts chemical energy stored in hydrocarbon fuel into electrical energy by means of an electrical reaction. Generally, a fuel cell comprises an anode and a cathode separated by an electrolyte matrix, which conducts electrically charged ions. In order to produce a useful power level, a number of individual fuel cells are stacked in series with an electrically conductive separator plate between each cell.

In building fuel cell systems, individual fuel cells are stacked together to form a fuel cell stack. The number of fuel cells determines the power rating of the fuel cell stack. To provide systems with higher power ratings, a number of fuel cell stacks are utilized and the outputs of the fuel cell stacks are combined to provide the desired power output. In certain fuel cell systems, the fuel cell stacks may be organized in one or more fuel cell stack modules, each of which includes one or more fuel cell stacks housed in an enclosure or a containment structure.

A multi-stack fuel cell system may include a fuel cell stack module with multiple fuel cell stacks housed within a common enclosure. In a system of this design developed for high temperature fuel cell stacks and, in particular, for molten carbonate fuel cell (MCFC) stacks, a box-like containment structure is employed as the enclosure and the fuel cell stacks may be arranged along the length of the containment structure. Each fuel cell stack within the fuel cell module may have inlet manifolds for receiving fuel and oxidant gases needed to operate the fuel cell stack and outlet manifolds for conveying spent fuel and oxidant gases as anode and cathode exhausts from the fuel cell stack. The containment structure of the fuel cell module includes fuel and oxidant gas inlet ports that communicate through ducts with the respective fuel and oxidant gas inlet manifolds of the fuel cell stacks, and fuel and oxidant gas outlet ports that communicate through ducts with the oxidant and fuel gas outlet manifolds.

In internally reforming fuel cells, a reforming catalyst is placed within the fuel cell stack to allow direct use of hydrocarbon fuels such as pipe line natural gas, liquefied natural gas (LNG), liquefied petroleum gas (LPG), bio-gas, methane containing coal gas, etc., without the need for expensive and complex external reforming equipment. In an internal reformer, water and heat produced by the fuel cell are used by the reforming reaction, and hydrogen produced by the reforming reaction is used in the fuel cell. The heat produced by the fuel cell reaction supplies heat for the endothermic reforming reaction. Thus, internal reforming is used to cool the fuel cell stack.

Two different types of internally reforming fuel cell designs have been developed and used. The first type of an internally reforming fuel cell is a Direct Internally Reforming (DIR) fuel cell module, in which direct internal reforming is accomplished by placing the reforming catalyst within an active anode compartment of the fuel cell. A second type of internally reforming fuel cell utilizes Indirect Internal Reforming (IIR), which is accomplished by placing the reforming catalyst in an isolated chamber within the fuel cell stack and routing the reformed gas from this chamber into the anode compartment of the fuel cell. An internally reforming MCFC system, also called Direct Fuel Cell (DFC), which incorporates both DIR and IIR, has evolved as the choice for environmentally friendly power generation and is the leading commercial option for green power. Carbonate power plants have lower emissions of greenhouse gases and particulate matter than conventional combustion-based power plants. Carbonate power plants emit little NOx gas, SOx gas, or particulate matter. Carbonate power plants have been designated "ultra-clean" by the California Air Resources Board (CARB).

SUMMARY

The present disclosure relates to a high efficiency fuel cell system that allows for partial separation of $CO_2$ present in the anode exhaust stream of a topping fuel cell module in order to increase overall efficiency and power output of the system. In a high efficiency fuel cell system, topping fuel cell modules and bottoming fuel cell modules are arranged in series, where the topping fuel cell modules are present in the system in a greater number than the bottoming fuel cell modules. The bottoming fuel cell modules receive as a fuel input the anode exhaust of the topping fuel cell modules. Since the anode exhaust has already been depleted of the fuel contained in the fuel input to the topping fuel cell modules (e.g., about ⅔ of fuel is consumed in the reactions of the topping fuel cell modules), the content of the anode exhaust of the topping fuel cell models is significantly diluted with byproducts such as $CO_2$ and water. Such dilution decreases the efficiency and output power of the bottoming fuel cell modules. A decrease in efficiency is greater realized when a fuel already containing diluents, such as renewable biogas produced from anaerobic digesters and landfills and syngas produced from coal gasifiers, is used as the input fuel as compared to when a natural gas fuel is utilized.

In addition, in the high fuel efficiency system, anode exhaust produced by the bottoming fuel cell modules is oxidized with air to prepare oxidant gas for input to the topping fuel cell modules. However, at this point, an already high percentage (e.g., greater than 75%) of the fuel input into the system has been utilized in the reactions of the topping and bottoming fuel cell modules. This results in a substantially large $CO_2$ concentration in the oxidant gas provided to the topping fuel cell modules. Such a large concentration of $CO_2$ in the cathode gas input to the topping fuel cell modules can negatively affect the cathode catalyst (e.g., NiO catalyst) of the fuel cells in the topping fuel cell modules by leading to dissolution and subsequent precipitation of Ni in the electrolyte matrix layer. This, in turn, impacts the overall performance and life of the fuel cell.

In order to maintain $CO_2$ concentration in the cathode inlet of the bottoming fuel cell modules at a less harmful level (e.g., less than 20%), excess air is added to the anode exhaust oxidizer output gas before the oxidized gas is supplied to the cathode inlet of the bottoming fuel cell module. However, this may result in the dilution of the oxidant supplied to the topping fuel cell module, thus increasing complexity and thermal inefficiency.

To overcome the above inefficiencies, the high fuel efficiency system of the present disclosure provides a $CO_2$ separation unit that receives at least a portion of the anode exhaust of the topping fuel cell modules and separates carbon dioxide present in the anode exhaust stream. The $CO_2$-depleted stream can then be conveyed back into the system to be received into the anode portion of the bottoming fuel cell modules, allowing for improved performance and higher output power by the bottoming fuel cell modules. The separated $CO_2$ can be exported out of the system and used for other purposes (e.g., oil production needs or underground storage to prevent $CO_2$ emissions), thereby improving the efficiency of the system as a whole. In addition, with partial $CO_2$ separation, dilute fuels may be used without impacting performance or increasing harmful $CO_2$ concentration.

In some embodiments, a high efficiency fuel cell system includes a topping fuel cell assembly including a topping cathode portion and a topping anode portion; a carbon dioxide separation unit that receives at least a portion of an anode exhaust stream output from the topping anode portion and separates the portion of the anode exhaust stream into a carbon dioxide stream and a carbon dioxide depleted stream; and a bottoming fuel cell assembly including a bottoming cathode portion and a bottoming anode portion. The bottoming anode portion receives the carbon dioxide depleted stream output from the carbon dioxide separation unit. The carbon dioxide depleted stream being richer in hydrogen than the portion of the anode exhaust stream output from the topping anode portion.

In some embodiments, a fuel cell system includes a topping fuel cell assembly comprising a topping cathode portion and a topping anode portion and a bottoming fuel cell assembly comprising a bottoming cathode portion and a bottoming anode portion. A method for increasing an efficiency of the fuel cell system includes diverting at least a portion of an anode exhaust stream output from the topping anode portion to a carbon dioxide separation unit; separating, via the carbon dioxide separation unit, the portion of the anode exhaust stream into a carbon dioxide stream and a carbon dioxide depleted stream; and feeding the carbon dioxide depleted stream output from the carbon dioxide separation unit to the bottoming anode portion. The carbon dioxide depleted stream being richer in hydrogen than the portion of the anode exhaust stream output from the topping anode portion.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein FIG. 1 shows a high efficiency fuel cell system having an intermediate $CO_2$ recovery system according to one embodiment.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

The present disclosure provides a high efficiency fuel cell system having improved performance and efficiency through partial separation of carbon dioxide contained in the anode exhaust output of topping fuel cell modules.

FIG. 1 schematically shows a modular fuel cell system 200 according to one embodiment of the present invention. The fuel cell system 200 is a high efficiency fuel cell system such as the fuel cell systems disclosed in U.S. patent application Ser. No. 14/578,077, filed Dec. 19, 2014, which is incorporated herein by reference in its entirety. As shown in FIG. 1, the system 200 improves overall efficiency of the high efficiency fuel cell system and allows for the separation of carbon dioxide from the fuel cell system.

The fuel cell system 200 of FIG. 1 includes a topping fuel cell assembly and a bottoming fuel cell assembly. In FIG. 1, the topping fuel cell assembly includes first and second topping fuel cell modules 202, 212, while the bottoming fuel cell assembly includes a bottoming fuel cell module 222. The first topping fuel cell module 202 comprises one or more first fuel cell stacks 202A. Each fuel cell stack includes two or more fuel cells and a first topping cathode portion 204 and a first topping anode portion 206. Although FIG. 1 shows the first topping fuel cell module 202 as having one fuel cell stack, in some embodiments, the first fuel cell topping module 202 may include two or more fuel cell stacks having similar configurations and being disposed within a common containment structure. The fuel cell stacks in the first topping fuel cell module 202 may include MCFC stacks. In each fuel cell of each fuel cell stack 202A, the first topping cathode portion 204 and the first topping anode portion 206 are separated by molten carbonate electrolyte (not shown) stored in an electrolyte matrix.

In some embodiments, the first topping fuel cell stack 202A may be an internally reforming fuel cell stack and may include direct internal reforming, indirect internal reforming, or a combination of both direct and indirect internal reforming. In the embodiment shown in FIG. 1, the first topping fuel cell stack 202A includes one or more internal reforming units 248 that are configured to receive a portion of the fuel feed and convey reformed or partially reformed fuel, including hydrogen and carbon monoxide, to a fuel turn manifold 206A, which directs the fuel to the first topping anode portion 206 of the cells of the stack where the fuel undergoes an electrochemical reaction with oxidant gas passing through the first topping cathode portion 204. As further shown in FIG. 1, the first topping cathode portion 204 receives oxidant gas provided to the common containment structure through an open stack face. However, in other embodiments, the oxidant gas may be supplied to the first topping cathode portion 204 through a cathode inlet manifold (not shown).

As shown in FIG. 1, the first topping cathode portion 204 outputs cathode exhaust to a cathode outlet manifold 208. Cathode exhaust is then conveyed from the cathode outlet manifold 208 via suitable ducting to a heat exchanger 236, which may be provided interior or exterior to the first topping fuel cell module 202. The first topping anode portion 206 conveys anode exhaust to an anode outlet manifold 210. Anode exhaust is then conveyed from the anode outlet manifold 110 of the first topping fuel cell module 202 to the bottoming fuel cell module 222.

The first topping stack 202A may include one or more internal reforming units 248. Hydrogen, carbon dioxide, and carbon monoxide are produced from fuel passing through the one or more internal reforming units 248. Reformed or partially reformed fuel is then supplied to the first topping anode portion 206 of the stack via the fuel turn manifold 206A. In the first topping anode portion 206 of the stack, hydrogen electrochemically reacts to produce water, carbon monoxide either reacts electrochemically to form carbon dioxide or chemically with water to produce hydrogen and carbon dioxide. Direct internal reforming (DIR) may also be provided in each cell of the first topping stack 202A by placing reforming catalyst in one or more anode compartments of the first topping anode portion 206, and in particular, by placing the reforming catalyst in corrugations of an anode current collector of the one or more anode compartments of each cell in the stack.

As discussed above, the first topping fuel cell module 202 may include multiple first topping fuel cell stacks. The number of fuel cell stacks in each fuel cell module may be determined based on the desired power output. The number of fuel cells in each fuel cell stack may be determined by the required output, size and weight of the stacks and ease of transportation. The stacks may be provided vertically, horizontally, or a combination of both.

As shown in FIG. 1, the topping fuel cell assembly of the fuel cell system 200 further includes the second topping fuel cell module 112, which includes one or more second fuel cell stacks. As with the first topping fuel cell module 202, while the second topping fuel cell module 212 is shown with a single fuel cell stack 212A, two or more second topping fuel cell stacks 212A may be included in the second fuel cell module 212 and housed in the same containment structure. The second topping fuel cell stacks in the second topping fuel cell module 212 may comprise high temperature MCFC.

The second topping fuel cell stack 212A includes a second topping cathode portion 214 and a second topping anode portion 216. Each cell of a stack is separated by an electrolyte matrix having molten carbonate electrolyte (not shown). Fuel entering the second topping anode portion 216 is reformed internally to produce partially or fully reformed fuel including hydrogen and carbon monoxide, which then undergoes an electrochemical reaction with oxidant gas passing through the second topping cathode portion 214. In the second topping anode portion 216 of the stack, hydrogen electrochemically reacts to produce water, and carbon monoxide either reacts electrochemically to form carbon dioxide or chemically with water to produce hydrogen and carbon dioxide. The second topping fuel cell stack 212A may include indirect internal reforming, direct internal reforming, or a combination of both direct and indirect internal reforming. In some embodiments, the second topping fuel cell stack 212A may include one or more reforming units 250 configured to receive a portion of the fuel feed and convey reformed or partially reformed fuel, including hydrogen and carbon monoxide, to a fuel turn manifold 216A, which then directs the fuel to the second topping anode portion 216 of the stack where the fuel undergoes the electrochemical reaction with the oxidant gas. As further shown in FIG. 1, the second topping cathode portion 214 receives oxidant gas provided to the common containment structure through an open cathode inlet stack face. However, in other embodiments, the oxidant gas may be supplied to the second topping cathode portion 214 through a cathode inlet manifold (not shown).

As shown in FIG. 1, the second topping cathode portion 214 conveys cathode exhaust to a cathode outlet manifold 218. Cathode exhaust is then output from the cathode outlet manifold 218 via suitable ducting to a heat exchanger 238 which can be provided either inside or outside the second topping fuel cell module 212. The second topping anode portion 216 conveys anode exhaust to an anode outlet manifold 220. Anode exhaust is then conveyed from the anode outlet manifold 220 to outside of the second topping fuel cell module 212 for use in the bottoming fuel cell module 222.

The second topping fuel cell stack 212A may include one or more internal reforming units 250. Hydrogen, carbon dioxide and carbon monoxide are produced from fuel passing through the one or more internal reforming units 250. Reformed or partially reformed fuel is then supplied to the second topping anode portion 216 of the stack via the turn manifold 216A. Direct internal reforming (DIR) may also be provided in the second topping stack 212A by placing reforming catalyst in the one or more anode compartments of the second topping anode portion 216, and in particular, by placing the reforming catalyst in corrugations of an anode current collector of the one or more anode compartments in each cell of the second topping stack 212A.

Similarly, as described above with respect to the first topping fuel cell module 202, the second topping fuel cell module 212 may include multiple second topping fuel cell stacks having similar construction. The number of fuel cell stacks per module may be determined based on the desired power output. The number of fuel cells in each fuel cell stack may be determined by the required output, size and weight of the stacks and ease of transportation.

As shown in FIG. 1, the fuel cell system 200 includes the bottoming fuel cell assembly having the bottoming fuel cell module 222. The bottoming fuel cell module 222 includes one or more fuel cell stacks 222A housed by a common containment structure. Each fuel cell in the bottoming fuel cell stack 222A includes a bottoming cathode portion 224 and a bottoming anode portion 226. Each cell of a stack is separated by an electrolyte matrix having molten carbonate electrolyte (not shown).

The bottoming fuel cell stack 222A may be an internally reforming fuel cell stack and may include direct internal reforming, indirect internal reforming, or a combination of both direct and indirect internal reforming. The bottoming fuel cell stack 222A may include a direct internal reforming catalyst placed in the one or more anode compartments of the bottoming anode portion 226, and in particular, in corrugations of an anode current collector of the one or more anode compartments in each cell of the bottoming fuel cell stack 222A. Although in the embodiment shown in FIG. 1, the bottoming fuel cell stack 222A does not include indirect internal reforming, in other embodiments, the bottoming fuel cell stack may include one or more reforming units for further reforming the anode exhaust received from the first and second topping modules before the reformed anode exhaust is conveyed to the bottoming anode portion 2126.

As shown in FIG. 1, the bottoming cathode portion 224 receives oxidant gas, provided to the common containment structure through an open cathode inlet stack face. However, in other embodiments, oxidant gas may be supplied to the bottoming cathode portion 224 through a cathode inlet manifold. The oxidant gas in FIG. 1 includes fresh air which is preheated and supplied to the bottoming cathode portion.

A first portion of the preheated fresh air may be combusted with anode exhaust output from the bottoming anode portion in an anode oxidizer assembly 231, 233 to produce heated oxidant gas which is then conveyed to the bottoming cathode portion together with a second portion of the pre-heated fresh air.

The bottoming cathode portion 224 outputs cathode exhaust rich in $CO_2$ into a cathode outlet manifold 228. As shown in FIG. 1, cathode exhaust collected in the cathode outlet manifold 228 is then output from the bottoming fuel cell module 222 to the first and second topping cathode portions 204 and 214 via appropriate ducting 263. In the embodiment of FIG. 1, the cathode exhaust output from the bottoming fuel cell module 222 is split about evenly between the first and second topping cathode portions. However, in other embodiments, the relative amounts of the cathode exhaust provided to the first and second topping cathode portions may be controlled based on desired system operation. Cathode exhaust ducting 263 in the bottoming module also includes a heat exchanger 264 to cool down the cathode exhaust from the bottoming module before it is conveyed to the first and second topping cathode portions 204 and 214. This is done to control the cathode inlet temperature of the first and second topping cathode portions 204 and 214.

In one embodiment, a portion of the heated oxidant gas supplied by the oxidizer assembly 231, 233 before it is mixed with a second portion of preheated fresh air, is diverted to the cathode exhaust ducting 263 in the bottoming module. This is done to control the concentration of $CO_2$ in the heated oxidant gas that is supplied to the bottoming cathode portion 224. If the cathode inlet to the bottoming fuel cell module becomes too rich in $CO_2$, the $CO_2$ concentration in the cathode inlet gas supplied to the bottoming fuel cell modules may be modulated to minimize Ni dissolution by increasing the second portion of the preheated fresh air. The temperature of the cathode inlet to the bottoming fuel cell module is controlled by modulating the temperature of the preheated fresh air.

The concentration of $CO_2$ and temperature of the inlet oxidant gas conveyed to the first and second topping fuel cell modules 202, 212 and the bottoming module 222 may be adjusted and modulated. Control of these adjustments may be performed by a programmable controller 252 or similar device. For example, the cathode exhaust of the bottoming fuel cell module 222 may be diluted with fresh air in order to control the temperature and concentration of $CO_2$ in the inlet oxidant gas conveyed to the first and second topping fuel cell modules. If the cathode exhaust from the bottoming fuel cell module becomes too rich in $CO_2$, the $CO_2$ concentration in the cathode inlet gas supplied to the first and second topping fuel cell modules may be modulated to minimize Ni dissolution by diluting the bottoming fuel cell module's cathode exhaust with fresh air and/or controlling the amount of fresh air supplied to the oxidizer assembly 231, 233 and the amount of oxidant gas produced by the oxidizer 233 supplied to the bottoming fuel cell module.

In some embodiments, a cathode booster blower 242 may be placed in the cathode exhaust ducting 263 that conveys cathode exhaust from the bottoming module 222 to raise the pressure of the first and second topping cathode portions 204 and 214 in order to maintain required differential pressure between the anode and cathode portions in the first and second topping modules 202 and 212, respectively.

Similarly as described above with respect to the first topping fuel cell module 202, the bottoming fuel cell module 222 may include multiple bottoming fuel cell stacks, each having a cathode portion and an anode portion. The number of fuel cell stacks per module is determined based on the number needed to provide the desired power output and the efficiency. The fuel cell stacks 222a in the bottoming fuel cell module 222 may include high temperature molten carbonate fuel cells.

As shown in FIG. 1, the bottoming anode portion 226 of the bottoming fuel cell module 222 is operably coupled to each of the first topping anode portion 206 and the second topping anode portion 216 such that the bottoming anode portion 226 receives anode exhaust output from both the first and the second topping anode portions 206 and 216. The first topping anode portion 206 and the second topping anode portion 216 are therefore configured in a two-to-one ratio with the bottoming anode portion 226.

Furthermore, the total number of fuel cell stacks of the first and second topping fuel cell modules 202 and 212 are configured in a two-to-one ratio with the number of fuel cell stacks of the bottoming fuel cell module 222. In other embodiments, the number of topping modules and bottoming modules will vary, and the total number of topping fuel cell stacks and bottoming fuel cell stacks may also vary. For increased efficiency, the number of topping modules may be greater than the number of bottoming modules, and/or the total number of topping fuel cell stacks may be greater than the total number of bottoming fuel cell stacks. The topping modules or stacks have higher current density (because of better fuel quality) and fuel utilization than the bottoming modules or stacks.

During operation, the first and second topping fuel cell modules 202, 212 each receive a portion of the fuel feed, such as methane, natural gas, or other suitable fuel, from a fuel supply. Prior to being conveyed to the topping fuel cell modules 202, 212, the fuel feed may be preheated and/or processed. For example, a humidifier may be used to humidify the fuel feed and a preconverter 234 may be used to partially reform some of the fuel feed externally of the topping fuel cell modules. Moreover, the fuel feed may be deoxidized in a deoxidizer, desulfurized in a desulfurizer (not shown) and/or undergo other processing as may be required to meet fuel cell specifications for purity. Preheated and/or processed fuel feed is then divided between the first and second topping fuel cell modules 202, 212, with the first topping fuel cell module 202 receiving a first portion of the fuel feed and the second topping fuel cell module 212 receiving a second portion of the fuel feed, and the first and second portions of the fuel feed may be controlled to be about the same or to be different in amount. The controller 252 may be used to control the respective amounts of the first and second fuel feeds supplied to the first and second topping fuel cell modules 202, 212. The fuel feed portions received in each of the first and second topping fuel cell modules 202, 212 are then pre-heated using cathode exhaust heat output from the respective topping fuel cell module in first and second heat exchangers 236, 238, respectively. In some embodiments the heat exchangers 236 and 238 can be combined into one heat exchanger. In each of the first and second fuel cell modules 202, 212, the pre-heated fuel feed portion is then conveyed to the topping anode portion 206, 216 of the one or more fuel cell stacks of the respective topping module and may be reformed in an indirect internal reformer 248, 250 before being conveyed to the respective topping anode portion 206, 216.

The first and second topping fuel cell modules 202, 212 consume a portion of the fuel contained in the respective fuel feed portions conveyed to the topping fuel cell module, so that the anode exhaust output the first and second topping modules 202, 212 contains the remaining fuel portion therein. In the embodiment shown in FIG. 1, the first and second fuel cell modules 202, 212 consume about two-thirds of the fuel in the fuel feed, and output anode exhaust containing the remaining portion of fuel, which is about one third of the initial fuel in the fuel feed. In FIG. 1, the fuel cell system 200 includes an anode booster blower 232 which is disposed downstream from the first and second topping fuel cell modules 202, 212 and upstream of the bottoming fuel cell module 222. The anode booster blower 232 receives anode exhaust output from the first and second topping anode portions 206, 216 and increases the pressure of the anode exhaust before it is conveyed to the bottoming fuel cell module 222. The anode booster blower 232 operates with a low pressure increase, resulting in low compression power and low cost. The anode booster blower 232 operation may be controlled by the controller 252 so as to control the differential pressure between the anode and cathode portions of the first and second topping fuel cell modules 202 and 212 respectively.

After exiting the anode booster blower 232 and before being supplied to the bottoming fuel cell module 222, the anode exhaust may be partially or fully diverted to a $CO_2$ separation unit 300 through the use of a valve and the controller 252. The $CO_2$ separation unit 300 may be any appropriate unit that utilizes processes for separating $CO_2$ from a gas stream, such as cooling, compression, cryogenic separation, amine absorption and stripping, or high temperature $CO_2$ selective membrane separation. In some embodiments, the $CO_2$ separation unit 300 may be placed upstream of the anode booster blower 232. In embodiments where the $CO_2$ separation unit 300 uses a process of cooling or cryogenic compression, some or most of the water in the anode exhaust may also be recovered. Water recovery in this case will happen during the $CO_2$ separation process. $CO_2$ separation likely involve multistage compression and cooling. Water recovery will occur during the initial compression cooling stages of the process. Typical equipment used for the $CO_2$ separation include gas compressors, heat exchangers and refrigeration equipment.

As shown in FIG. 1, the $CO_2$ separation unit 300 produces two streams, a $CO_2$-rich stream 301 and a $CO_2$-depleted stream 302. As shown in the FIGURE, the $CO_2$-rich stream 301 may be exported from the system for other uses, such as underground storage and/or oil production needs. However, in other embodiments, the $CO_2$-rich stream 301 may be returned to the system 200 by conveying the stream 301 to the cathode exhaust output from the bottoming fuel cell module 222 before being introduced as the cathode inlet gas for the topping fuel cell modules 202, 212. For example, the stream 301 may be introduced to the cathode exhaust output at a point upstream of the cathode exhaust booster 242.

The $CO_2$-depleted stream 302 is partially depleted of the $CO_2$ content that was present in the anode exhaust (e.g., about 15% or less in the case of natural gas fuels and about 35% or less in the case of biogas or syngas fuels). With this partial depletion, the $CO_2$-depleted stream 302 is richer in fuel compared to the anode exhaust output of the topping fuel cell modules. As shown in FIG. 1, the $CO_2$-depleted stream 302 may be returned to the anode exhaust output and be introduced as anode inlet gas for the bottoming fuel cell module 222. This allows for a relative increase in hydrogen concentration in the fuel provided to the bottoming fuel cell module 222, resulting in higher output power and efficiency of the bottoming fuel cell module 222.

In other embodiments, the $CO_2$ separation unit 300 may further include an adiabatic methanation reactor, which methanates the $CO_2$-depleted stream 302. By methanating the $CO_2$-depleted stream 302 and then feeding the stream 302 to the bottoming fuel cell module 222, a higher power output of the bottoming fuel cell module 222 may be realized due to the enhanced cooling methane reformation caused by the methanated stream 302. In embodiments where the $CO_2$ separation unit 300 uses a process of cooling or cryogenic compression, water in the anode exhaust will also be recovered. Water removal will help the methanation process. In yet other embodiments, the ratio of the number of topping fuel cell modules to the number of bottoming fuel cell modules may be increased (e.g., greater than 2:1). By providing a methanated $CO_2$-depleted stream 302, the gas inputted into the bottoming fuel cell module, which may be comparable to a 50%-diluted natural gas stream, may allow the bottoming fuel cell module to operate at a power output that is comparable to the topping fuel cell modules. In addition, in this embodiment, part of the $CO_2$-rich stream 301 may be supplied to the topping fuel cell modules. Moreover, in other embodiments, as shown in FIG. 1, a portion of the methanated $CO_2$-depleted stream 302 may be diverted and recycled back to the fresh fuel stream before it is conveyed to the humidifier and/or before the pre-converter 234.

As noted above, the intermediate $CO_2$ recovery system allows for the use of dilute fuels, such as biogas and syngas, in the system 200 without increasing the risk of damaging the cathode catalyst of the fuel cells due to increased $CO_2$ concentration. As biogas and syngas may contain sulfur compounds, a cleanup system 400, as shown in FIG. 1, may be utilized to remove these contaminants before the fuel is introduced into the topping fuel cell modules.

As shown in FIG. 1, the anode exhaust, now containing a portion or all of the $CO_2$-depleted stream 302 produced by the $CO_2$ separation unit 300, may be supplemented with fresh fuel 251. The supplemental fresh fuel may be mixed with the anode exhaust without requiring any additional water to humidify the fuel since the anode exhaust stream from the first and second topping fuel cell modules 202, 212 includes adequate amounts of water. The amount of fresh fuel supplied to the bottoming fuel cell module may be controlled by the controller 252 so as to achieve a desired fuel utilization and current generation in the bottoming fuel cell module. The supplemental fresh fuel may be supplied from the same fuel supply as the topping fuel cell modules, or may be supplied from a different fuel supply. In some embodiments, the supplemental fresh fuel comprises a reformable fuel such as methane.

Anode inlet gas comprising anode exhaust from the topping fuel cell modules and optionally supplemental fresh fuel is received in the bottoming fuel cell module 222 and is conveyed to the bottoming anode portion 226 of the fuel cell stack or stacks in the bottoming fuel cell module. As discussed above, the anode inlet gas may be reformed through direct internal reforming in the bottoming anode portion, and anode exhaust produced by the bottoming anode portion is output from the bottoming fuel cell stack or stacks via the anode outlet manifold 230. Anode exhaust output from the bottoming fuel cell module 222 is conveyed to the anode oxidizer assembly that includes a mixer/eductor 231 and the oxidizer 233. The mixer/eductor 231 also receives a first portion of pre-heated air input into the system and mixes the anode exhaust with the pre-heated air, and the oxidizer 233 oxidizes the anode exhaust with the pre-heated air to output a high temperature oxidant gas suitable for use in a fuel cell cathode. As shown in FIG. 1, the high temperature oxidant gas output from the oxidizer 233 is combined with a second portion of the pre-heated air to form cathode inlet gas which is then input into the bottoming cathode portion 224 of the bottoming module 222. The amount of the first portion of pre-heated air provided to the mixer/eductor 231 is controlled by the controller 252. The amount of pre-heated air provided to the mixer/eductor 231 is controlled so as to control the temperature of the inlet oxidant gas to the bottoming cathode portion 224 and to control the temperature of the cathode exhaust output from the bottoming cathode portion 224.

In one embodiment, a portion of the heated oxidant gas supplied by the oxidizer assembly 231, 233 before it is mixed with a second portion of preheated fresh air, is diverted to the cathode exhaust ducting 263 in the bottoming module via ducting 265. This is done to control the concentration of $CO_2$ in the heated oxidant gas that is supplied to the bottoming cathode portion 224. If the cathode inlet to the bottoming fuel cell module becomes too rich in $CO_2$, the $CO_2$ concentration in the cathode inlet gas supplied to the bottoming fuel cell modules may be modulated to minimize Ni dissolution by increasing the second portion of the preheated fresh air. The temperature of the cathode inlet to the bottoming fuel cell module is controlled by modulating the temperature of the preheated fresh air.

Cathode exhaust ducting 263, in the bottoming module also includes a heat exchanger 264 to cool down the cathode exhaust from the bottoming module before it is conveyed to the first and second topping cathode portions 204 and 214. This is done to control the cathode inlet temperature of the first and second topping cathode portions 204 and 214.

As can be seen in FIG. 1, fresh air is supplied to the system 200 using a blower 245. A first portion of the air, which may include all or a portion of the air supplied by the blower 245, is conveyed to a heat exchanger 246 for heating. The cathode exhaust 208 and 218 from the first and second topping modules 202 and 212, respectively, is used to heat the first portion of air in the heat exchanger 246. In some embodiments, some or all of the first air portion may be bypassed around the heat exchanger 246 via a bypass line 246a, and the amount of air bypassed around the heat exchanger 246 may be controlled by the controller 252 and will depend on the desired temperature of the inlet oxidant gas input into the bottoming cathode portion 224 and the desired temperature of the cathode inlet of the topping cathode portions 202 and 212. An air heater 266, is positioned downstream of the heat exchanger 246 to heat the first portion of air in certain modes of operation, such as when the system is heating up or not producing power or at low output. The air heater 266 may be a natural gas fired heater or an electric heater. The output of the air heater 266 is controlled by the controller 252 depending on the desired temperature of the inlet oxidant gas input into the bottoming cathode portion 224 and the desired temperature of the cathode inlet of the topping cathode portions 202 and 212. In this way, the controller 252 is able to control the temperature of the inlet oxidant gas conveyed to the bottoming cathode portion 224 and the temperature of the cathode inlet oxidant gas conveyed to the topping cathode portions 204 and 214, and thus, the temperature in the fuel cell stacks 202a, 212a, and 222a of the topping modules 202, 212, and bottoming module 222, respectively.

As shown in FIG. 1, a first portion of the pre-heated air output from the air heater 266 is conveyed to the anode oxidizing assembly 231, 233 for oxidizing the anode exhaust, as discussed above, and the second portion of pre-heated fresh air is conveyed to the bottoming cathode portion 224. As shown and discussed above, the remaining pre-heated air is combined with the oxidant gas output from the oxidizer 233 before being input into the bottoming cathode portion 224. Before oxidant gas output from the oxidizer 233 mixes with the second portion of the preheated fresh air, a portion of the oxidant gas output from the oxidizer 233 is conveyed to the cathode exhaust duct 263 from the bottoming modules via the bypass duct 265. This is done to reduce the concentration of $CO_2$ in the oxidant inlet gas input into the bottoming cathode portion 224. The diversion of the oxidant gas from the oxidizer 233 to the topping modules is controlled by the controller 252 or similar device.

Before oxidant gas output from the oxidizer 233 mixes with the second portion of the preheated fresh air, the cathode exhaust portion from the bottoming module is cooled in a heat exchanger 264, using the second portion of preheated fresh air. This is done to control the cathode inlet temperature of the cathode inlet portion 204 and 214 of the first and second topping modules, respectively.

In such embodiments, all or a portion of the cathode exhaust output from the bottoming module 222 would be conveyed through the heat exchanger 264 and some of the heat in the cathode exhaust would be used to pre-heat the second portion of preheated fresh air being conveyed along with the output of the anode exhaust oxidizer 233 to the inlet of cathode portion 224 of the bottoming module 222. The amount of air supplied to the heat exchanger 264 is adjustable by the controller 252 so as to control the cathode inlet temperature of the first and second topping modules. The amount of cathode exhaust conveyed to the heat exchanger 264 may also be controlled by the controller 252 or similar device by controlling a valve 264a so as to control the cathode inlet temperature of the oxidant gas entering the topping modules. The heat exchanger may be located in the bottoming module 222.

Cathode exhaust output from the bottoming cathode portion 224 is then conveyed to the first and second topping modules 202, 212 for use as oxidant gas in the first and second topping cathode portions 204, 214. The system 200 may also include a cathode exhaust booster 242 provided on the cathode side downstream from the bottoming module 222 and upstream from the topping modules 202, 212 for increasing the pressure of the cathode exhaust output from the bottoming module 222 before being conveyed to the topping modules. In this way, the pressure differential between the anode side and the cathode side in the topping modules may be adjusted and controlled so as to maintain a low differential pressure between the cathode and the anode sides. The controller 252 or similar control device may be used for controlling the operation of the cathode exhaust booster so as to control the differential pressure between the anode and cathode sides.

The cathode exhaust output from the bottoming cathode portion 224 may be divided about equally between the first and second topping cathode portions 204, 214. However, in some embodiments, the amount of cathode exhaust from the bottoming cathode portion 224 received by each of the first and second topping cathode portions 204, 214 may be varied and controlled based on the desired operation and fuel utilization in the topping first and second topping modules 202, 212.

As shown in FIG. 1, some of the air supplied by the blower 245 may be bypassed around the bottoming fuel cell module 222 and may be supplied as supplemental oxidant gas to the first and second topping fuel cell modules 202, 212. Specifically, a third portion of the air from the blower 245 is conveyed via a bypass duct 262 to the first topping fuel cell module 202 for use in the first topping cathode portion 204, and a fourth portion of the air form the blower 245 is conveyed via a bypass duct 261 to the second topping cathode portion 214. As shown, the third air portion is combined with a portion of the cathode exhaust from the bottoming cathode portion 224 prior to being input into the first topping cathode portion 204, while the fourth air portion is combined with the remaining portion of the cathode exhaust from the bottoming cathode portion 224 prior to being input into the second topping cathode portion 214. The amounts of third and fourth air portions conveyed to the first and second topping cathode portions, respectively, is controlled by the controller 252 via suitable valves 262a, 261a so as to control the cathode inlet temperature of the inlet oxidant gas entering the topping modules.

After undergoing an electrochemical reaction in the topping fuel cells, spent oxidant is output from the first and second topping cathode portions 204, 214 as cathode exhaust. As discussed above, waste heat from cathode exhaust output from the first topping cathode portion 204 is used for pre-heating a portion of the fuel feed in the heat exchanger 236, and waste heat from the cathode exhaust output from the second topping cathode portion 214 is used to pre-heat the other portion of the fuel feed in the heat exchanger 238. After being output from the first and second topping modules 202, 212, cathode exhaust streams may be combined and conveyed to the fuel humidifier (not shown), which also receives fuel feed and water and where waste heat from the cathode exhaust is used to form steam and to humidify the fuel feed with the steam. The cathode exhaust may also be conveyed to the heat exchanger 246 so that waste heat remaining in the cathode exhaust is used for pre-heating incoming air.

In the embodiment shown in FIG. 1, the system 200 includes a water recovery assembly 260 for recovering water from the cathode exhaust. After the waste heat in the cathode exhaust is recovered in the heat exchangers 236, 238, the fuel humidifier (not shown in FIG. 1) and/or the heat exchanger 246, cooled cathode exhaust may be conveyed to the water recovery assembly 260, which recovers water from the cathode exhaust. Detailed construction of the water recovery assembly 260, which recovers water from the fuel cell system 200 exhaust is not shown in FIG. 1. Water recovered in the water recovery assembly 260 may be re-used in the fuel cell system 200 for humidifying the fuel feed. As shown in FIG. 1, water separated cathode exhaust is then output from the system 200 by venting or the like. Although not shown in FIG. 1, the same or separate water recovery assembly may be used to also recover water in a portion of the anode exhaust output from the bottoming anode portion 226. U.S. Pat. No. 8,367,256, assigned to the same assignee herein and incorporated herein by reference, discloses an exemplary water recovery assembly that may be used as a water recovery assembly. The $CO_2$ separation unit 300 may further include a water recovery assembly configured to remove water from the anode exhaust stream. In such a system, the anode booster blower 232 may be placed downstream of the $CO_2$ separation unit 300.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed:

1. A high efficiency fuel cell system comprising:
a topping fuel cell assembly comprising a topping cathode portion and a topping anode portion;
a carbon dioxide separation unit that receives at least a portion of an anode exhaust stream output from the topping anode portion and separates the portion of the anode exhaust stream into a carbon dioxide stream and a carbon dioxide depleted stream, the carbon dioxide depleted stream being richer in hydrogen than the portion of the anode exhaust stream output from the topping anode portion; and
a bottoming fuel cell assembly comprising a bottoming cathode portion and a bottoming anode portion, wherein the bottoming anode portion receives the carbon dioxide depleted stream output from the carbon dioxide separation unit.

2. The high efficiency fuel cell system of claim 1, wherein:
the topping fuel cell assembly comprises a plurality of topping fuel cell modules;
the bottoming fuel cell assembly comprises one or more bottom fuel cell modules; and
a number of topping fuel cell modules present in the high efficiency fuel cell system is greater than a number of bottoming fuel cell modules present in the high efficiency fuel cell system.

3. The high efficiency fuel cell system of claim 2, wherein a ratio of the number of topping fuel cell modules present in the high efficiency fuel cell system to the number of bottoming fuel cell modules present in the high efficiency fuel cell system is at least 2:1.

4. The high efficiency fuel cell system of claim 2, wherein each of the topping fuel cell modules and the bottoming fuel cell modules comprises one or more high temperature fuel cells.

5. The high efficiency fuel cell system of claim 4, wherein each of the one or more high temperature fuel cells is a molten carbonate fuel cell.

6. The high efficiency fuel cell system of claim 1, wherein a fuel gas used in the topping fuel cell assembly and the bottoming fuel cell assembly comprises biogas or syngas.

7. The high efficiency fuel cell system of claim 1, further comprising a fuel supply configured to provide fresh fuel to the high efficiency fuel cell system, wherein:
the carbon dioxide separation unit and the fuel supply are configured such that in operation, at a merge point, a flow path from an outlet of the carbon dioxide separation unit configured to provide the carbon dioxide depleted stream merges with a flow path from an outlet of the fuel supply configured to provide the fresh fuel; and the merge point is located upstream of an inlet of the bottoming anode portion.

8. The high efficiency fuel cell system of claim 1, wherein:
the carbon dioxide separation unit and the topping anode portion are configured such that in operation, at a merge point, a flow path from an outlet of the carbon dioxide separation unit configured to provide the carbon dioxide depleted stream merges with a flow path from an outlet of the topping anode portion configured to provide a remaining portion of the anode exhaust stream that was not received by the carbon dioxide separation unit; and
the merge point is located upstream of an inlet of the bottoming anode portion.

9. The high efficiency fuel cell system of claim 1, wherein the carbon dioxide separation unit is configured such that in operation, the carbon dioxide separation unit separates carbon dioxide from the portion of the anode exhaust stream via cooling compression, cryogenic separation, amine absorption and stripping, or high temperature carbon dioxide selective membrane separation.

10. The high efficiency fuel cell system of claim 1, wherein the carbon dioxide separation unit comprises an adiabatic methanation reactor configured to methanate the carbon dioxide depleted stream prior to feeding the carbon dioxide depleted stream to the bottoming anode portion.

11. The high efficiency fuel cell system of claim 10, further comprising a preconverter configured to partially reform a fuel stream prior to feeding a partially reformed fuel stream to the topping anode portion,
wherein the carbon dioxide separation unit is configured to feed a first portion of the methanated carbon dioxide depleted stream to the bottoming anode portion and a second portion of the methanated carbon dioxide depleted stream to the preconverter.

12. The high efficiency fuel cell system of claim 1, wherein
the bottoming cathode portion and the carbon dioxide separation unit are configured such that in operation, at a merge point, a flow path from an outlet of the bottoming cathode portion configured to provide a cathode exhaust stream merges with a flow path from an outlet of the carbon dioxide separation unit configured to provide the carbon dioxide stream; and
the merge point is located upstream of an inlet of the topping cathode portion such that the topping cathode portion is configured to receive a carbon dioxide rich stream.

13. The high efficiency fuel cell system of claim 1, wherein the carbon dioxide separation unit is configured to output the carbon dioxide stream to an underground storage or an oil production facility.

14. The high efficiency fuel cell system of claim 1, wherein the carbon dioxide separation unit further comprises a water recovery assembly configured to recover at least a portion of water present in the anode exhaust stream.

15. The high efficiency fuel cell system of claim 1, further comprising:

at least one heat exchanger configured to cool a cathode exhaust stream output from the topping cathode portion, and
a water recovery assembly downstream of the at least one heat exchanger, the water recovery assembly configured to recover at least a portion of water present in the cathode exhaust stream.

16. The high efficiency fuel cell system of claim 14, wherein the water recovery assembly is further configured to recover at least a portion of water present in the anode exhaust stream.

17. The high efficiency fuel cell system of claim 1, further comprising:
a mixer/eductor configured to receive and mix an anode exhaust stream from the bottoming anode portion and pre-heated air to form a mixed anode exhaust stream; and
an oxidizer configured to oxidize the mixed anode exhaust stream and output a high temperature oxidant stream,
wherein the bottoming cathode portion receives the high temperature oxidant stream.

18. The high efficiency fuel cell system of claim 17, further comprising:
an air supply configured to provide fresh air to the high efficiency fuel cell system; and
an air heater configured to receive fresh air from the air supply and pre-heat the fresh air to a predetermined temperature, wherein:
the oxidizer and the air heater are configured such that in operation, at a merge point, a flow path from an outlet of the oxidizer configured to provide the high temperature oxidant stream merges with a flow path from an outlet of the air heater configured to provide a portion of the pre-heated fresh air; and
the merge point is located upstream of an inlet of the bottoming cathode portion.

19. A method for increasing an efficiency of a fuel cell system including a topping fuel cell assembly comprising a topping cathode portion and a topping anode portion and a bottoming fuel cell assembly comprising a bottoming cathode portion and a bottoming anode portion, the method comprising:
diverting at least a portion of an anode exhaust stream output from the topping anode portion to a carbon dioxide separation unit;
separating, via the carbon dioxide separation unit, the portion of the anode exhaust stream into a carbon dioxide stream and a carbon dioxide depleted stream, the carbon dioxide depleted stream being richer in hydrogen than the portion of the anode exhaust stream output from the topping anode portion; and
feeding the carbon dioxide depleted stream output from the carbon dioxide separation unit to the bottoming anode portion.

20. The method of claim 19, further comprising methanating the carbon dioxide depleted stream, or combining the carbon dioxide depleted stream with a fresh fuel stream or a remaining portion of the anode exhaust stream that was not diverted to the carbon dioxide separation unit, prior to being fed to the bottoming anode portion.

* * * * *